Nov. 17, 1970         J. W. BEHRENDT ET AL         3,541,502
                    DEEP SUBMERGENCE TRANSDUCER
Filed Jan. 3, 1969                                 2 Sheets-Sheet 1

INVENTORS
JOHN W. BEHRENDT
BY GLEN L. HUNSAKER
ATTORNEYS

Nov. 17, 1970     J. W. BEHRENDT ET AL     3,541,502
DEEP SUBMERGENCE TRANSDUCER

Filed Jan. 3, 1969     2 Sheets-Sheet 2

INVENTORS
JOHN W. BEHRENDT
GLEN L. HUNSAKER
BY
ATTORNEYS

2

United States Patent Office 3,541,502
Patented Nov. 17, 1970

3,541,502
DEEP SUBMERGENCE TRANSDUCER
John W. Behrendt, La Jolla, and Glen L. Hunsaker, San Diego, Calif., assignors to the United States of America as represented by the Secretary of the Navy
Filed Jan. 3, 1969, Ser. No. 788,817
Int. Cl. H04r 1/44
U.S. Cl. 340—8         3 Claims

ABSTRACT OF THE DISCLOSURE

All rubber-like pressure release materials for transducers are flattened and made inoperative at moderate depths in the ocean. To increase the operating depth, the interior of the housing of the transducer is placed under air pressure. In one embodiment, a bellows structure is employed to equalize the inside and outside pressure over a wide range of depths of submergence.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

For an underwater transducer to operate effectively, a baffle structure must be provided, including a housing and a yieldable material called pressure release material, for supporting the vibrating element. Ideally, the housing is sealed and a volume of air is trapped behind the vibrating element to permit free reciprocation of the element. As the external hydrostatic pressure rises, the element is biased against the pressure release material and at moderate depths the element is clamped immovably against the housing, whereupon the transducer becomes inoperative.

SUMMARY OF THE INVENTION

To increase the depth of submergence beyond which the prior art transducers are inoperative, it is proposed according to this invention to pressurize the interior of the transducer housing. Ideally, atmospheric pressure within the housing is adjusted so that at the depth at which the transducer is to operate, the pressure gradient between the inside and outside of the housing is minimized or zero.

To keep this pressure gradient at a minimum over a wide range of depths, a collapsible diaphragm or wall structure is provided in the transducer housing so that the exterior hydrostatic pressure can be transmitted directly to the interior air pressure.

OBJECTS OF THE INVENTION

The principal object of this invention is to increase the effective depth of submergence of an operating transducer.

A more specific object of this invention is to provide improved means for minimizing pressure gradients between the interior and exterior of the transducer housing as the housing is varied in depth.

DESCRIPTION OF THE PREFERRED EMBODIMENTS

Figure 1:
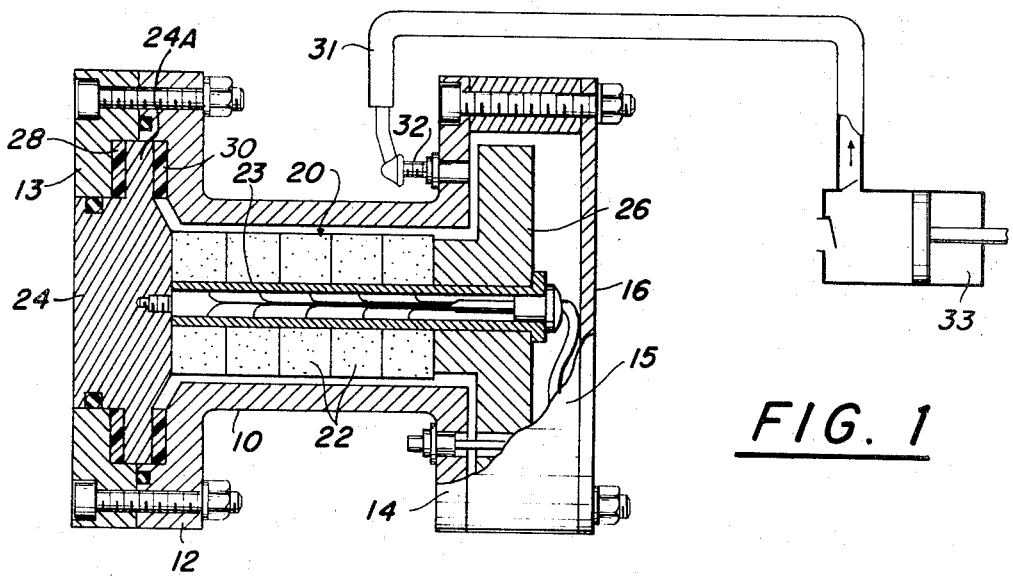
FIG. 1 shows a half-section of one transducer embodying the features of this invention.

For simplicity, the housing 10 of the transducer in FIG. 1 will be assumed to be round. The flange 12 at one end of the housing is bolted to the collar of 13. The flange 14 at the other end of the housing is bolted to the skirt 15 and header 16.

The vibratory motor 20 of the transducer comprises a series of stacked piezoelectric rings 22. Such rings might, for example, consist of a polarized barium titanate with metallic electrodes either on the inner and outer cylindrical surfaces or at the ends of the cylindrical rings. When energized with an alternating current signal, the rings expand and contract in axial dimensions in conformance with the signal phase and amplitude. This means that the length of the stack of rings can be made to change appreciably at any frequency over a fairly broad band. The mechanical energy thus generated can be transmitted into the surrounding water by clamping the rings between the headpiece 24 and the tailpiece 26. Preferably, the tailpiece is of greater mass than the headpiece so that the tailpiece stands substantially stationary while the headpiece is vibrated. To ensure that the ceramics of the rings 22 remain always under compression, the tension rod 23 is extended centrally through the stack and is tightened by screw threads.

To permit the free vibratory motion of the headpiece 24, the headpiece must be slidably mounted in the opening of the housing collar 13. The peripheral flange 24A of the headpiece is supported between the two gasket washers 28 and 30. It will be perceived, now, that as the external hydrostatic pressure increases, the gasket 30 will be compressed and at a predetermined pressure the elastic limit will be exceeded and the yieldable material 30 will be permanently deformed. With loss of elasticity in the pressure release material, the transducer is inoperative. Likewise, pressure internally of the housing will compress gasket 28 and pressures in excess of the elastic limit of the gasket can result in destruction of the transducer.

Figure 2:
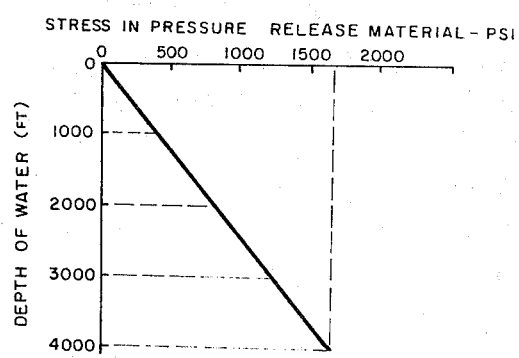
FIG. 2 is a graph of the hydrostatic pressure in pounds per square inch at varying depths of submergence in water.

FIG. 2 shows an elementary pressure-depth, straight-line characteristic of ocean water. A hydrostatic pressure of .43 pound per square inch will be assumed for each vertical foot of submergence. There is no known rubber or resilient material which can withstand, without damage, the pressures at 5,000 feet.

Figure 3:
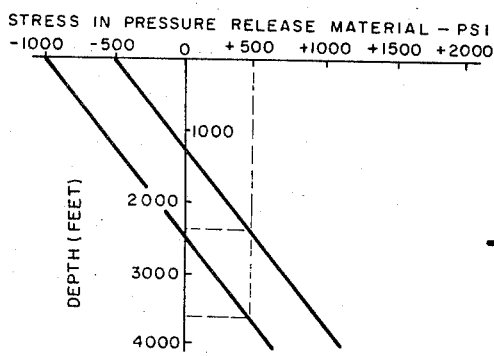
FIG. 3 is a graph of depth versus pressure gradient for the embodiment shown in FIG. 1.

According to this invention, the interior of housing 10 is pressurized by the gas compressor 33 which communicates through plumbing connections 31 to the valve stem 32. If the external hydrostatic pressure pressing the headpiece against gasket 30 is considered positive, the internal atmospheric pressure tending to press the headpiece against gasket 28, can be considered negative. When the internal and external pressures are equal there is no pressure gradient to bias the headpiece in either direction. As shown in FIG. 3, the straight-line pressure-depth characteristic is shifted to the left by the amount of internal pressurization. If, for example, gas at 500 pounds per square inch is forced into the housing, the transducer can be submerged to a depth of 1,160 feet, corresponding to 500 pounds per square inch, to produce zero pressure gradient between the inside and the outside of the housing. If the transducer is lowered to 2,320 feet, the gradient would be reversed and a positive 500 pounds could be applied to the transducer. If 1,000 pounds per square inch internal pressure is employed, the transducer can be lowered to near 4,000 feet.

Figure 4:
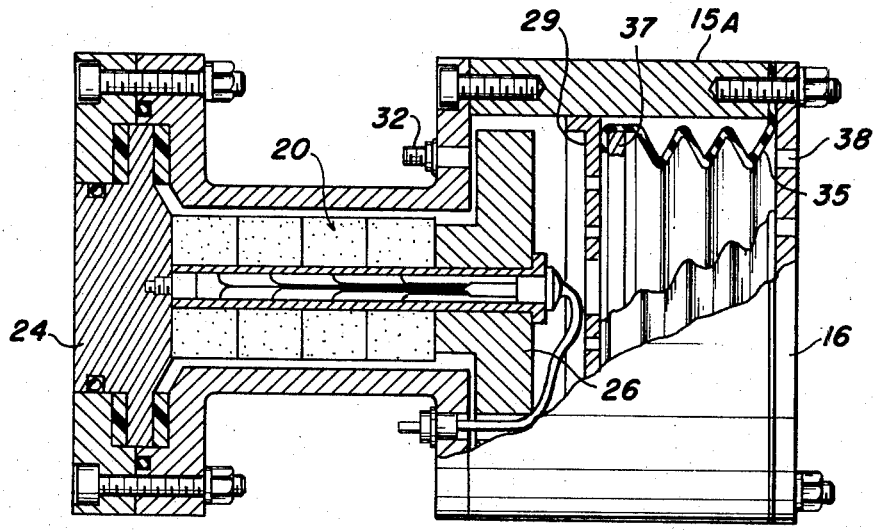
FIG. 4 is a partly sectioned view of another embodiment of the transducer embodying this invention.
Figure 5:
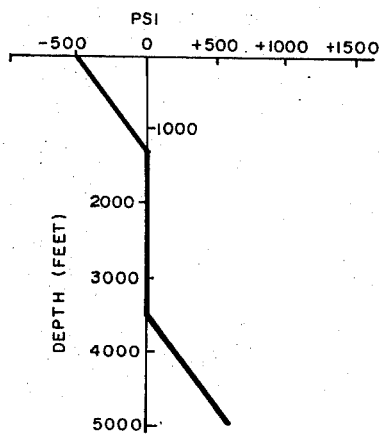
FIG. 5 is a graph of the pressure versus depth of the transducer housing shown in FIG. 4.

Now let it be assumed that operating conditions, including the properties of the pressure release materials at 28 and 30, require lower positive and negative pressures on the transducer, and that it operates effectively over a wide range of depths. To this end, the embodiment of the novel transducer of this invention of FIG. 4 is disclosed. The skirt 15A is lengthened and incloses the collapsible bellows 35 supporting the diaphragm 37. Holes 38 in the header 16 permit the bellows to freely flood. The air valve 32 is provided to pressurize the housing as in FIG. 1. In response to gas pressure, diaphragm 37 will ride against header 16, or against any structure provided for that purpose. As the depth of submergence increases, the hydrostatic pressure increases, and when the external pressure exceeds the internal, the diaphragm 37 begins to move to the left in FIG. 4. There after, the atmospheric pressure within the housing 10 begins to increase. With the air valve 32, the initial bias applied to the interior of the housing can be adjusted to any desired value. If, as suggested in FIG. 5, the initial gas pressure is 500 pounds, the depth of submergence must be increased to about 1,120 feet before the pressure gradient is zero and the diaphragm can start to move. Thereafter, the freely movable diaphragm can keep the internal and external pressures equal. In the example illustrated, a depth of about 3,500 feet is assumed at which depth the diaphragm reaches its limit of travel against stop plate 29. At greater depths, the positive bias on the headpiece increases at the usual rate. The safe limit of the assumed transducer is about 4,500 feet. Thus, the pressure gradient can be minimized over a wide range of depth submergence according to this invention. Of course, the maximum depth range of the transducer of FIG. 4 depends upon the initial gas pressure and upon the ratio of volumes of gas within the housing before and after the diaphragm movement. That is, initial pressure and the compression ratio controls ultimate depth.

What is claimed is:
1. The method of extending the operable depth of submergence of a transducer having a vibrator within a housing and a vibratory face exposed to the exterior of the housing and with yieldable pressure release material sealing the vibrator to the housing for absorbing the back waves, the method comprising the steps of:
   filling said housing with gas to a pressure commensurate with the hydrostatic pressure at the depth of submergence at which the transducer is to operate;
   lowering said transducer in water to a depth where the pressures interiorly and exteriorly of said housing are substantially balanced; and
   then applying signals to said transducers.
2. The method defined in claim 1 further comprising the step of variably compressing the atmosphere within said housing in response to changing hydrostatic pressure exteriorly of said housing.
3. The method defined in claim 2 further comprising the step of predetermining the maximum compression of said atmosphere by selecting the pressure of the initial gas filling of said housing and predetermining the ratio of the volume of the interior of said housing before and after submergence to maximum depth.

References Cited
UNITED STATES PATENTS

| | | | |
|---|---|---|---|
| 2,429,104 | 10/1947 | Olson | 340—8 |
| 2,648,837 | 8/1953 | Mounce | 340—8 |
| 3,328,751 | 6/1967 | Massa | 340—10 |

RICHARD A. FARLEY, Primary Examiner

B. L. RIBANDO, Assistant Examiner

U.S. Cl. X.R.
340—10